United States Patent
Hamann (10) Patent No.: US 7,168,898 B2
(45) Date of Patent: Jan. 30, 2007

(54) PROCESS AND DEVICE FOR MACHINING BY WINDOWING OF NON-DEFORMABLE THIN PANELS

(75) Inventor: Jean-Christophe Hamann, La Baule (FR)

(73) Assignee: Airbus France, Toulouse (FR)

( * ) Notice: Subject to any disclaimer, the term of this patent is extended or adjusted under 35 U.S.C. 154(b) by 0 days.

(21) Appl. No.: 11/055,522

(22) Filed: Feb. 10, 2005

(65) Prior Publication Data

US 2005/0260051 A1 Nov. 24, 2005

(30) Foreign Application Priority Data

Feb. 10, 2004 (FR) .................................. 04 01276

(51) Int. Cl.
*B23C 3/16* (2006.01)
(52) U.S. Cl. .................. 409/199; 409/205; 409/218; 409/219; 409/224; 409/225; 269/21; 269/266
(58) Field of Classification Search ............... 409/199, 409/205, 218, 219, 220, 224, 225; 269/21, 269/266; 29/281.1
See application file for complete search history.

(56) References Cited

U.S. PATENT DOCUMENTS

| | | | | |
|---|---|---|---|---|
| 4,088,312 A | * | 5/1978 | Frosch et al. ................. 269/21 |
| 4,527,783 A | * | 7/1985 | Collora et al. ................ 269/21 |
| 4,583,891 A | * | 4/1986 | Eschenfelder et al. ...... 409/120 |
| 5,163,793 A | * | 11/1992 | Martinez ..................... 409/205 |
| 5,249,785 A | * | 10/1993 | Nelson et al. ................ 269/21 |
| 5,364,083 A | | 11/1994 | Ross et al. |
| 5,395,098 A | * | 3/1995 | Eickhorst et al. ............. 269/21 |
| 5,457,868 A | * | 10/1995 | Blaimschein ................ 269/21 |
| 5,621,965 A | * | 4/1997 | Turchan ...................... 29/559 |
| 5,722,646 A | * | 3/1998 | Soderberg et al. .......... 269/266 |
| 6,121,781 A | | 9/2000 | Martinez |
| 6,170,157 B1 | | 1/2001 | Munk et al. |
| 6,796,014 B2 | * | 9/2004 | Sarh ............................ 269/21 |
| 7,076,856 B2 | * | 7/2006 | Sarh .......................... 29/524.1 |
| 2005/0263950 A1 | * | 12/2005 | Hamann .................... 269/266 |
| 2006/0039765 A1 | * | 2/2006 | Hamann ..................... 408/87 |

FOREIGN PATENT DOCUMENTS

| EP | 0 507 033 A1 | 10/1992 |
|---|---|---|
| EP | 689898 A2 * | 1/1996 |
| EP | 1 245 317 A1 | 10/2002 |
| JP | 2-147809 A * | 6/1990 |

* cited by examiner

*Primary Examiner*—Erica Cadugan
(74) *Attorney, Agent, or Firm*—Patterson, Thuente, Skaar & Christensen, P.A.

(57) ABSTRACT

An apparatus and method for machining of thin panels, in particular, panels having a complex shape, specifically non-deformable panels, in which the panel to be machined is placed beforehand in an isostatic position, characterized by: one defines one or more areas of a predetermined extent for purposes of machining, named machining windows, in the area of the panel to be machined; and perpendicular to each machining window; one of surfaces of panel is held in position without introducing positioning hyperstatism; the actual shape of the aforementioned surface is measured; the desired machining operation is performed on the opposite surface by taking the aforementioned measured surface as a reference; and the aforementioned surface is released.

6 Claims, 7 Drawing Sheets

PROCESS AND DEVICE FOR MACHINING BY WINDOWING OF NON-DEFORMABLE THIN PANELS

RELATED APPLICATION

The present application claims priority to French Application No. 04 1276 filed Feb. 10, 2004.

TECHNICAL FIELD

The present invention concerns machining through the removal of material from fine, flexible parts, in particular of a complex shape, such as panels of a non-deformable shape, e.g., aircraft fuselage panels. In particular the invention relates to a machining process and apparatus that is applicable to metallic panel types with or without stiffeners, composite panels, or "sandwich" type panels, on which machining operations affecting their thickness are to be performed, such as surfacing or the formation of recesses or cells, or routing or drilling operations.

BACKGROUND OF THE INVENTION

The panels disclosed in this invention are panels having a double curvature, mainly located at the front of aircraft. These panels, generally made of a light alloy, have thicknesses ranging from 1 to 12 mm depending on the aircraft and the components of the panel (aluminum alloy, titanium alloy, metal composite or composite containing an organic resin).

If the material permits, the production of these panels requires shaping by drawing on a necessarily convex mold, while panels of composite material are shaped by draping-joining-infusion and compaction methods.

Because of its productivity and its flexibility, shaping by drawing is mainly employed.

This type of shaping is performed by means of a combination of traction on the panel and "envelopment" of the aforementioned convex mold so that the geometrically known shape of the panel (that which was in contact with the drawing mold) is the internal (concave) surface. The drawing process generates a plastic deformation of the overall thickness of the panel and consequently, through constriction, leads to a thinning of the section. Due to the non-deformable nature of the shape, this "loss of thickness" is not uniform over all surfaces of the panel.

The machining of such panels has alignment problems.

According to the art of alignment, the positioning of a solid is known as isostatic positioning when the 6 degrees of freedom it has in space (3 rotations and 3 translations along the axes of a tetrahedron) are held fixed by means of contacts with 6 judiciously positioned physical points. The isostatic positioning of a non-deformable panel is accomplished as shown in FIG. 1 of the drawings attached to the present description.

SUMMARY OF THE INVENTION

Figure 1:
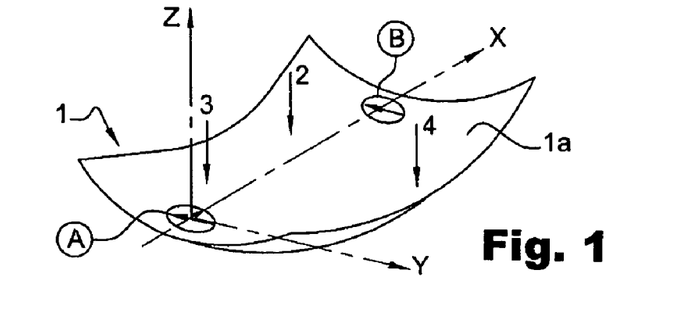
FIG. 1 shows the placement of a part in the form of a panel with a double curvature in an isostatic position.

FIG. 1 shows a thin metal panel 1 with a non-deformable shape that is obtained by drawing and into which two holes A and B, called pin registration holes, generally having a diameter of 12 and 14 mm are placed in the vicinity of two opposite edges. These holes are bored during the drawing operation when the rough piece is still located on the mold. They are used respectively for centering and orientation, and as illustrated by the figure, they stop translation along the axes X and Y as well as rotation about the axis Z (X being defined as the axis passing through the centers of the two holes A and B).

The three other degrees of freedom are eliminated by three contacts points 2, 3 and 4, which define plane in space.

When it is oriented in space in this manner, panel 1 is not subject to any stress related to its positioning. On the other hand, if one wishes to increase the number of contact points that are fixed in space, the system becomes "hyperstatic," and solid (panel 1) can only come in contact with the various points by deforming the solid and thus generating internal fastening stresses.

In the case of panel 1, which by definition has a low thickness compared with its volume, the "solid" to be aligned is deformable under the action of weak forces, such as the pressure applied in cutting it or even its own weight. Consequently, its positioning according to just isostatic principles is not sufficient to ensure a suitable alignment of the panel: It should be "rigidified" by supporting it with many more points than are necessary for its strict orientation in space. Based on this principle, there are two conventional methods for placing and holding complex parts that are flexible and of large size in position, namely aligning them on rigid tools and aligning them on a bed of suction cups.

Alignment on rigid tools consists of producing rigid tools of the same shape as the part. It is held in position by fastening to indents. In the case of a non-deformable shape, this hyperstatic positioning does not make it possible to support the panel over its entire surface and it moreover strongly stresses the part. These fastening stresses introduce an evolving elastic strain into the thickness of the panel. The machining of a part that is thus stressed across its thickness involves an unbalance in the distribution of the stresses and consequently an evolution of the panel's shape.

The alignment on a bed of suction cups is a solution, which, by limiting the number of support point, limits the degree of hyperstatism and consequently the internal fastening stresses. It is effective for all routing operations. On the other hand, the act of performing machining in the thickness direction requires a significant increase in the density of the supports. For example, if routing operations are satisfied with a space between supports of about 500 mm, machining operations for recesses require a space between supports of less than 150 mm. Consequently, this solution produces a similar result in terms of the quality of orientation compared with that obtained on rigid tools.

Solutions that involve positioning over the entire surface of the panel do not make it possible to effectively identify its shape in space and generate significant fastening stresses, which will lead to changes in shape on being relaxed.

The present invention seeks to mitigate the disadvantages of conventional alignment methods and proposes a machining process that allows a non-deformable panel, e.g., a molded panel to be held in position without stressing it, with alignment of its external convex surface based on its theoretical definition (internal surface) for purposes of the mechanical performance of precision machining operations such as those enumerated above.

To this end, the object of this invention is a process for machining thin panels, in particular panels having a complex shape, particularly non-deformable panels, in which process the panel to be machined is first placed in an isostatic position, characterized by:

one or more machining zones of predetermined dimensions, called machining windows, are defined on the panel, in the sections that are to be machined, and perpendicular to each machining window:

one of the surfaces of the panel is held in position without introducing positioning hyperstatism, the actual shape of the aforementioned surface is measured, the machining to be performed on the opposite surface is carried out by taking the aforementioned measured surface as a reference, and the aforementioned surface is released.

In such a process, one performs a new referencing that ensures an "automatic" correction for the possible variation in parallelism that can exist locally between the opposite surfaces of the panel with each windowing operation, i.e., with each machining accomplished perpendicular to each machining window.

An object of this invention is also a device for implementing this process, including a means for isostatic positioning of the panel on the machine, characterized by including moreover:

a means for holding one of the surfaces of the panel in position over a predetermined extent without introducing hyperstatism, a means for measuring the actual shape of the part of the aforementioned surface with regard to of aforementioned holding means, a means for displacing the aforementioned holding means with regard to the aforementioned surface of the panel, a multi-axis means for machining located over the other surface of the panel, and a means for synchronously controlling:

the successive displacement and location of the aforementioned holding means with regard to one of the aforementioned machining windows, the aforementioned machining means successively on the right of each machining window.

According to an embodiment of the device disclosed in this invention, the aforementioned means for holding in position without hyperstatism consist of a support including:

at least two positioning stops concurrent with the aforementioned isostatic positioning means to ensure isostatic positioning, multiple mobile, prehensile suction cups positioned toward the surface to be held, and means for contacting and locking each suction cup in position for purposes of holding the aforementioned surface after isostatic positioning of the panel.

According to another characteristic of the device disclosed in this invention, the aforementioned means for measuring the actual shape of the surface of the panel involving the aforementioned means of positioning consist, for each one of the aforementioned suction cups, of a transmitter of the position of the suction cup after it is locked in the position for holding the surface of the panel, with the aforementioned sensors being connected to a means for calculating the shape of the surface of the panel by interpolation of the positions of the various suction cups.

The isostatic positioning of the panel is accomplished based on the principle mentioned above, utilizing two registration holes placed on the periphery of the panel to be machined, on two opposite edges, and three reference contact points on the panel.

The process disclosed in this invention can be implemented according to two such positioning alternatives.

According to a first embodiment, the aforementioned surface is placed in contact with three reference points located within the machining window for every machining window and before gripping and holding the surface of the panel.

These three reference points can consist of three of the aforementioned positioning stops of the aforementioned means for holding in position.

According to a second embodiment, always on each window and before gripping and holding the surface of the panel, the aforementioned surface is placed in contact with two reference points located in the window, the third reference point being one of the two aforementioned registration holes.

The first two reference points can consist of two of the aforementioned positioning stops of the aforementioned means for holding in position.

Furthermore, a device for applying the panel against the aforementioned positioning stops for purposes of isostatic positioning prior to fastening the surface of the panel perpendicular to the window is preferably associated with these means for placing the panel in an isostatic position.

The process disclosed in this invention allows for significant improvements in comparison with existing processes, in particular in the production of recesses requiring a depth precision of less than 0.2 mm.

This process allows in particular for:

isostatic positioning of the panel without stress (no deformation in the course of machining), automatic machine programming (machining trajectories and positioning windowing) "within theoretical" limits, referencing to the external surface of the panel (guaranteed base thicknesses of recesses), instantaneous measurement of the actual shape nearest to the supports (no change of reference mark).

Other characteristics and advantages will be elucidated by the subsequent description of modes of implementation of the process disclosed in this invention, which description is provided only as an example and refers to the attached drawings.

DETAILED DESCRIPTION OF THE INVENTION

FIG. 1 illustrates schematically the principle of isostatic positioning of a panel 1 having a double curvature.

Panel 1 is a flexible, thin, non-deformable panel, e.g., a metal panel for covering an aircraft fuselage and has been shaped beforehand in a known manner by drawing on a convex mold.

As described above, such a panel 1 displays variations in thickness over its entire surface. The geometrically known surface of panel 1 is the concave internal surface 1a, which was in contact with the drawing mold. The reference surface is the opposite surface 1b (FIG. 2 and the following figures) and is convex, corresponding to the external wall of the fuselage that will be produced by employing the panel.

Since panel 1 is machined on its geometrically known surface 1a, whereas the reference surface is surface 1b and the thickness of the panel has variations which are not known, this obviously presents a machining problem, particularly if one wants to create recesses whose depth is to conform to a very precise machining precision of, for example, less than 0.2 mm.

Figure 2:
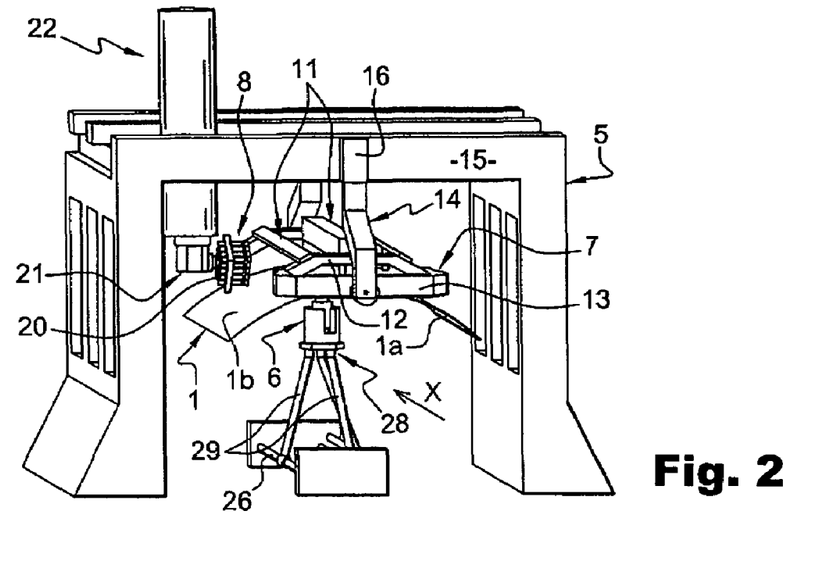
FIG. 2 is a perspective view of a device for implementing the process for this invention.

The device for implementing the process disclosed in this invention shown schematically in FIG. 2 includes a support 5 in the form of a gantry under which a doubled curved panel 1 that is to be machined is placed so that its concave surface 1a is turned towards the ground.

A multi-axis machining head 6 is positioned below panel 1.

On the one hand, means 7 for supporting and positioning the panel carried by the gantry 5 are located on top of panel 1 and, on the other hand, means 8 for holding the upper convex surface 1b of panel 1 in a localized manner are also carried by the gantry.

These means 7, 8 will now be described by also referring to FIGS. 3 and 4.

Figure 4:
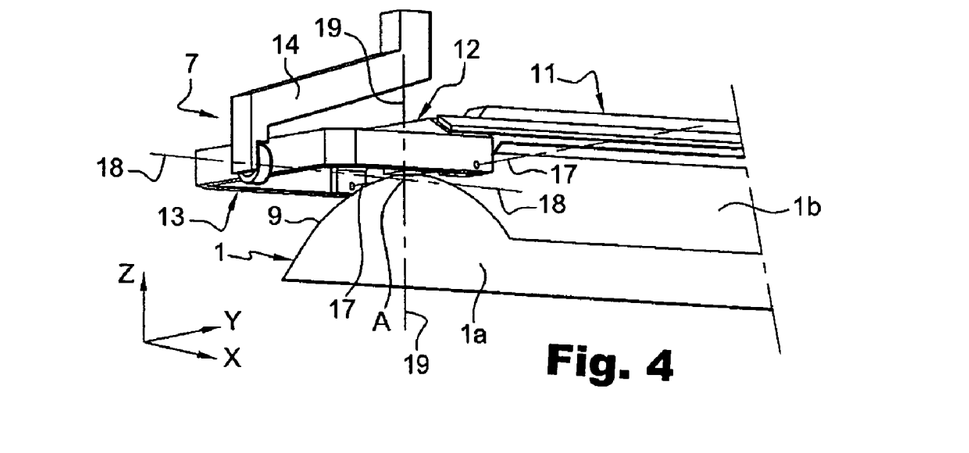
FIG. 4 is a partial view of the isostatic means of positioning of the device of FIG. 2.

Panel 1 is positioned by taking up two registration holes A and B in accordance with the drawing of FIG. 1, with one of these holes (A) being referenced in FIG. 4 in the vicinity of an edge 9 of the panel and the other hole being located in the vicinity of the opposite edge 10.

Panel 1 is supported perpendicular to the holes A and B by an assembly 11 of three horizontal beams, which are in turn attached at their ends to two swing bars 12 that are positioned perpendicular to the beam and whose ends are in turn held by clamps 13.

The clamps 13 are in turn taken up by arms 14, which are installed so that they can slide along the vertical axis Z on crosspieces 15 of the gantry 5, by means of a sliding coupling symbolized by 16.

The swing bars 12 can oscillate on the ends of the clamps 13 around an axis 17 passing through one of the registration holes (A, B).

At the lower end of the arms 14, the clamps 13 can oscillate around a horizontal axis 18, which is parallel to the axis X, which is itself parallel to the axis of the system of beams 11, with the axis 18 passing through the registration hole (A or B) associated with the clamp.

Lastly, the arms 14 can also slide along a vertical axis 19 passing through the associated registration hole (A or B).

The means 8 for holding the convex surface 1b of panel 1 in a localized manner consists of a device with suction cups 20 installed on a multi-axis head 21 of a manipulator 22 carried by gantry 5.

The head 21 can move on the manipulator 22 along the axis Z, while the manipulator can move along the axis Y on a cross slide 23 of the gantry 5 as well as along the axis X via a displacement of the crosspiece 23 on tracks 24 tied to the gantry.

Figure 3:
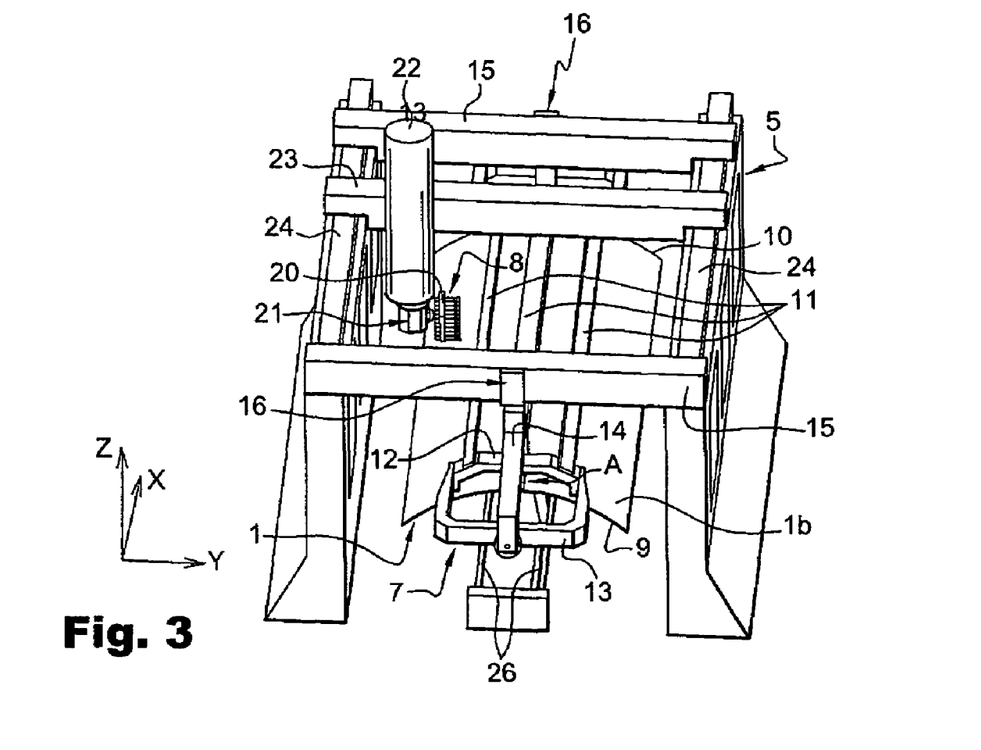
FIG. 3 is a perspective view of the device of FIG. 2 from another angle.

As shown in FIG. 3, the crosspiece 15 supporting panel 1, side 10, is installed so that it slides on the same tracks 24 for the purpose of fitting the span between the centers A-B of different panels and also to provide the kinematics of a deformable parallelogram during the rotation of panel 1 about the axis 17, while the crosspiece 15 located on the side 9 of the panel is held in a fixed position.

Figure 5:
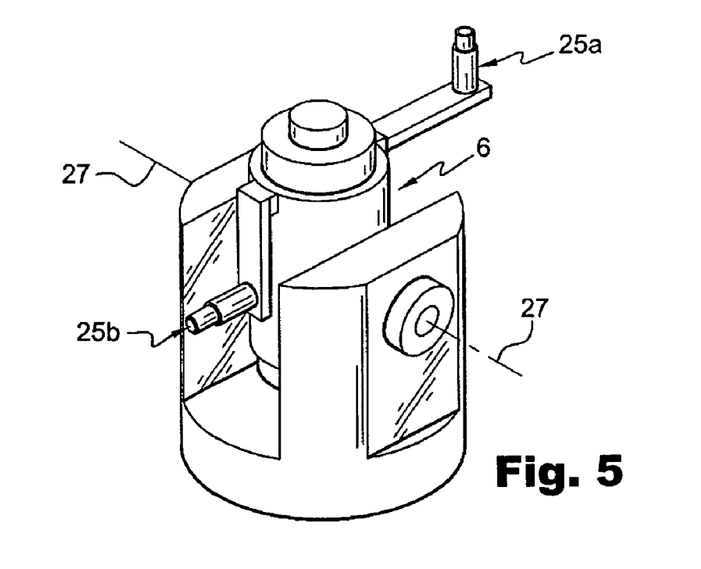
FIG. 5 is a view of a complementary means for positioning the panel associated with the machining head.

FIG. 5 shows a magnified view of the machining head without the machining tool but equipped with a complementary device for positioning panel 1 consisting of a pair of impeller arms, one of which (25a) is in the active position while the other one (25b) is in a retracted, inactive position, with the operation of this device being clarified further on.

The machining head has several degrees of freedom, e.g., five, and can in particular move along the axis X. It is, for this purpose, mounted so that it slides on guides 26 and rotates about an axis 27 (FIG. 5), which can itself swivel in a horizontal plane ball and socket joint 28 between the support of the machining head 6 and the supporting feet 29.

Figure 6:
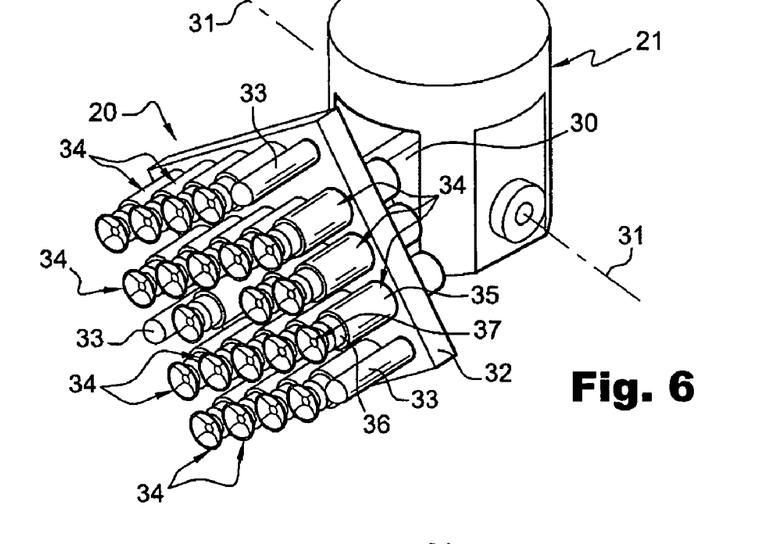
FIG. 6 is a perspective view of the means for gripping and holding one of the surfaces of a panel to be machined in a localized position.

FIG. 6 shows, in greater detail, the device with suction cups 20, which is installed in a rotatable manner on a support arm 30, which is in turn installed so that it can oscillate about a horizontal axis 31 on the head 21, which is in turn mobile by translating along the axis Z and rotating about the axis of the latter.

On the face facing panel 1, the device 20 includes a rotatable support 32, which is e.g., square, 500 mm on a side, from which, on the one hand, three stops 33, arranged in a triangle and, on the other hand, regularly distributed suction cup devices 34 project, with all of the elements, 33, 34 covering the entire surface of the turntable 32.

The stops 33 are rectilinear locating pins with spherical ends placed perpendicular to the turntable 32 and are of the same length.

The stops 33 are preferably as far away as possible from each other, and, as shown in FIG. 6, two are positioned at two angles of the turntable 32 and the third in the middle on the opposite side of the turntable.

The suction cup devices 34 are preferably distributed uniformly and aligned over the entire remaining surface of the turntable, parallel to the stops 33, with a constant spacing between the devices 34 of less than 150 mm.

Each device 34 includes (FIGS. 6 to 8) a sleeve 35 that is installed so that it is axially mobile on the turntable 32 and in which a centering pin 36 slides, which is, at its end, fitted with a suction cup 37.

Figure 7:
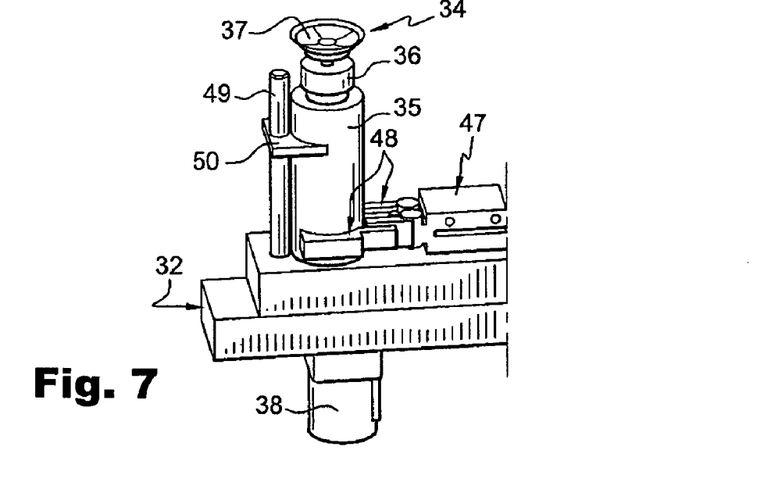
FIG. 7 is a more detailed view of the suction cup system of the aforementioned means for gripping and holding.
Figure 8:
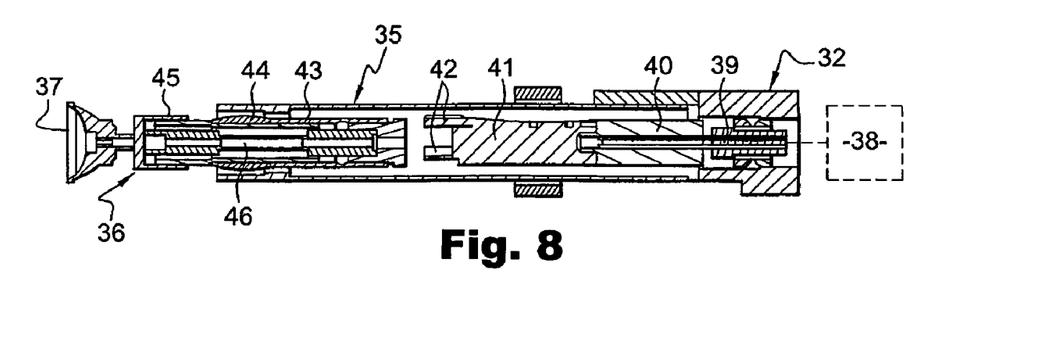
FIG. 8 is an axial cross-section of the suction cup system of FIG. 7.

The sleeve 35 is moved by a drive-arrest mechanism, including a motor 38 actuating a ball screw 39 held in the turntable 32 by means of a bearing, a nut 40 engaging the screw 39 and a fastening device 41 which is integral with the nut 40 and whose restraints 42 are, when they are averted, laid against the internal wall of the sleeve 35 thus linking it to the nut 40.

Figure 9A:
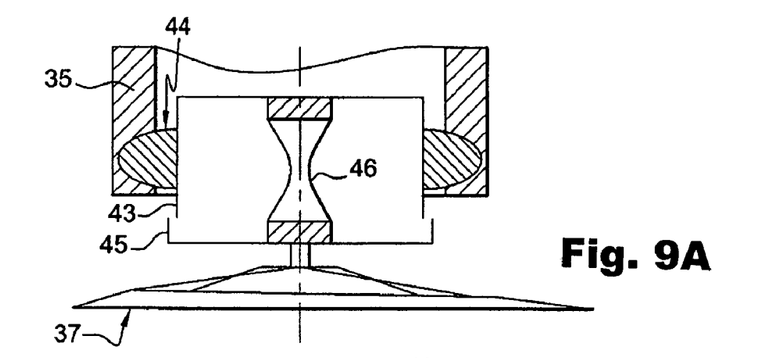
FIGS. 9a, 9b and 9c illustrate the installation and locking in position of the suction cups.

The sleeve 35 carries the centering (36) and suctioning (37) devices at its end, including (FIGS. 9*a*, 9*b*) a sleeve 43 connected to the sleeve 35 via a ball and socket joint 44 and closed by a cover 45, which is axially mobile with regard to the sleeve 43, under the action of a pneumatic element called a bladder 46, which is capable of contracting (FIG. 9*b*) or elongating (relaxation, FIG. 9*a*).

Item 47, in FIG. 7, shows a device for locking the sleeve 35 with regard to the turntable 32. The device 47 is fixed on the turntable and encloses the sleeve 35 with two arms 48.

Item 49 represents a transmitter of the distance separating it from the surface of the panel in question, i.e., the distance of the suction cup 37 from the turntable 32.

The sensor 49 is fixed laterally to the sleeve 35 by a leg 50.

The operation of the device described above is as follows:

Panel 1, which is to be held in position without being deformed, is first brought into contact, e.g., on its convex surface 1*b*, with the three stops 33 of the device of FIG. 6, by means of the impeller arms 25*a*, 25*b*, which are applied against the concave surface 1*a* in the direction of the support turntable 32 of the device.

When contact is established, the suction cup devices 34 are initially positioned (step 51, FIG. 9*c*) by actuating the motor 38 of the devices 34.

Setting the screw 39 in rotation, with the restraint 42 of the fastening device 41 being expanded and the arms 48 of the device 47 being loosened, involves a translational displacement of the sleeve 35-centering pin 36 assembly in the direction of the face 1 of panel 1.

Once the sleeve 35 has made contact with surface 1*a*, with this position having been being detected by the sensor 49, the motor 38 is stopped and the arms 48 are tightened by the immobilizing device 47 and thus the sleeve 35 with regard to the turntable 32.

The subsequent step (step 52, FIG. 9*c*) is the lowering of the suction cups unit 37. Panel 1, which is thus "drawn in," comes to be rest against the bottom of the suction cups. With these being shifted, e.g., by 1 mm, with regard to the theoretical position of the panel, the latter is locally stressed.

The bladders 46 (FIG. 9*a*) are then relaxed (step 53, FIG. 9*c*), so that panel 1 regains its stress-free shape through elastic relaxation, while the cover 45 disengages from the sleeve 43.

The suction cup 37 is then attached to the panel and, with the unit 37, 45, is held in position by the elasticity (in vacuum) of the pneumatic bladder 46. Because of their inherently low weight and their being held in position by the elasticity of the bladder 46, the aforementioned elements 37, 45 do not at all or hardly pull on the panel (step 54, FIG. 9*c*).

All of the centering pins 36 are thus simultaneously disengaged from their sleeve 35.

The following step consists of re-rigidifying the unit 32–34, the panel having again assumed its natural shape, without stress.

This step will be performed suction cup by suction cup so as not to deform the panel.

Figure 9B:
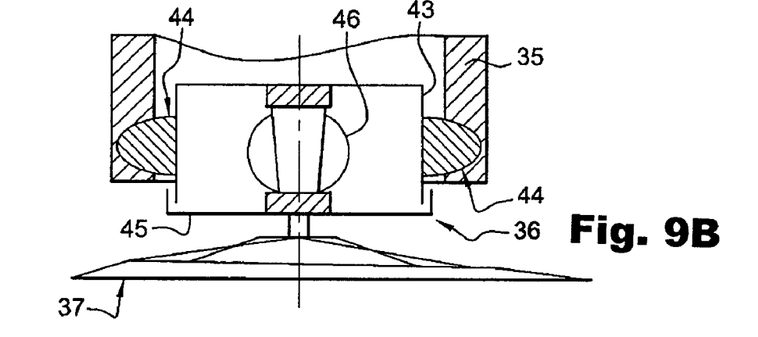
Figure 9C:
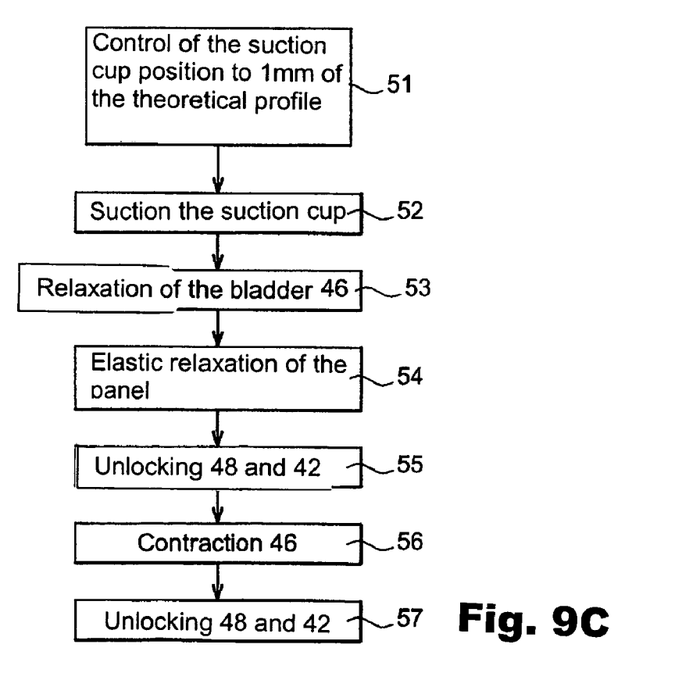

Thus, for each device 34 (step 55, FIG. 9*c*), the sleeve 35 is released externally by loosening the arms 48 and internally by retracting the restraint 42. On re-contracting (step 56, FIG. 9*c*) the bladder 46, the unit 36–35 approaches panel 1 and the sleeve 43 re-engages the cover 45 (FIG. 9*b*).

The last step (step 57, FIG. 9*c*) consists of re-immobilizing the sleeve 35 with regard to the turntable 32, via the restraints 42 of the device 41 and the arms 48 of the device 47.

Thus, the operation is carried out successively with all of the devices 34.

Panel 1, perpendicular to the turntable 32, is perfectly immobilized, in a stable manner, without deformation nor stress on this part of the panel and, in addition, the actual shape of surface 1 with regard to turntable 32 is known from calculations based on the measurements provided by sensors 49, which supply the precise position of surface 1*a* with regard to turntable 32 perpendicular to each suction cup device 34. A calculation by interpolation based on these measured points makes it possible to know the actual shape of the aforementioned surface 1*a*.

The operation of the machine represented in FIGS. 2 to 5 is as follows.

The first step for implementing the process disclosed in this invention is the isostatic positioning of panel 1 that is to be machined in the machine space, which is accomplished jointly by means 7 and means 8.

Figure 10A:
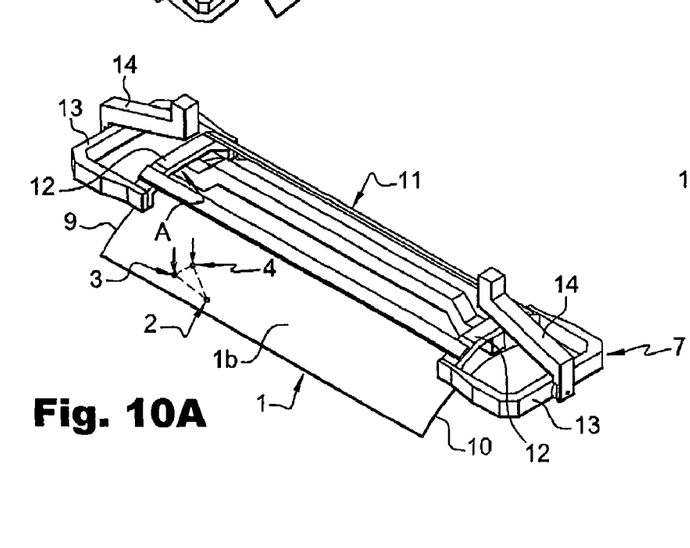
FIGS. 10a and 10b illustrate a first method for isostatic positioning.
Figure 10B:
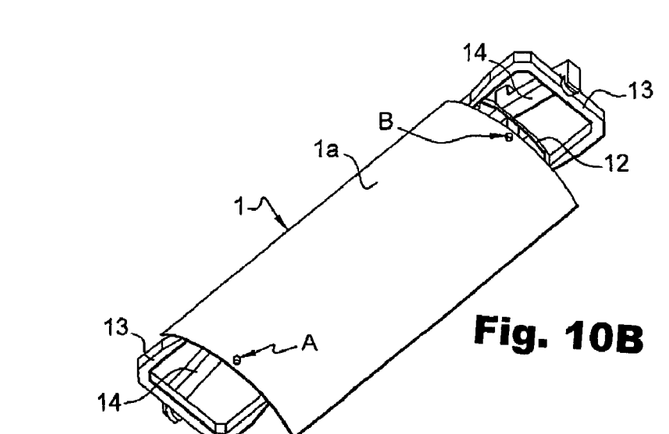

It will first be supposed that the positioning is accomplished according to the kinematics illustrated by FIGS. 10*a*, 10*b*, where FIG. 10*b* is a bottom view of panel 1 of FIG. 10*a* as suspended by the means of support 7.

The isostatic positioning is, in this case, provided by the registration holes A and B grabbed by the means 7 and by three complementary points of support 2, 3, 4 provided by the three stops 33 of means 8, which thus define a reference plane.

The positioning sequence proceeds in the following manner:

The means 8 are initially placed in the theoretical position of surface 1*b* of panel 1. The retractable arms 25*a*, 25*b* of the machining head 6 are then made to emerge and are applied against the other surface 1 of the panel so as to push the latter against stops 33. The means for controlling the motors for displacing elements 11, 13 and 14 along axes 17, 18 and 19 (FIG. 4) lock the aforementioned elements in their positions.

The suction cups 6 are then brought into the holding position of surface 1*b* of the panel, a vacuum is applied, and, finally, arms 25*a*, 25*b* are retracted.

The suction cup devices 6 adapt automatically to the shape of panel 1. The transmitters 49 allow this shape to be accurately identified. The total time for adaptation to the practical shape of the panel is about a few hundred milliseconds, including the measurement of the profile of surface 1*b* of the panel.

The means 8, which are called the machining window, are positioned over an area of surface 1*b* where machining by the head 6 to be performed.

Once the machining has been performed (drilling, routing or machining of a recess), the aforementioned window 8 is disconnected from the panel and is moved so as to be positioned at the height of another area of surface 1*b*, which may or may not be contiguous to the area that has just been machined.

In the case of the positioning method of FIGS. 10*a*, 10*b*, the reference plane for machining is defined by window 8, namely by the three stops 33 (support points 2, 3 and 4).

Figure 14:
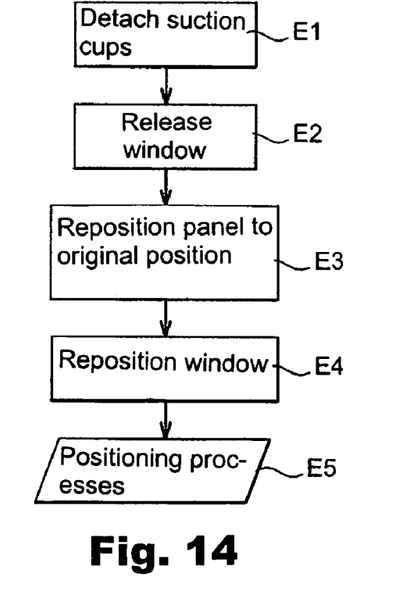
FIG. 14 is a flow chart describing the method for actuating the means for holding the suction cups in a mode in conformity with FIGS. 10a, 10b.

The process for disconnecting window 8 and repositioning it in another place is illustrated by the flow chart of FIG. 14.

At step E1, the suction cups 37 are disconnected and then, at step E2, window 8 is released.

At step E3, panel 1 is repositioned by means 7.

At step E4, window 8 is repositioned with the assistance of arms 25a, 25b and, at step E5, suction cups 37 are repositioned to capture surface 1b of the panel, including measurement of the profile of this region of the panel.

This positioning kinematics and displacement of window 8 is preferable for the machining of recesses dimensions (extents) that are smaller than those of window 8.

Figure 11A:
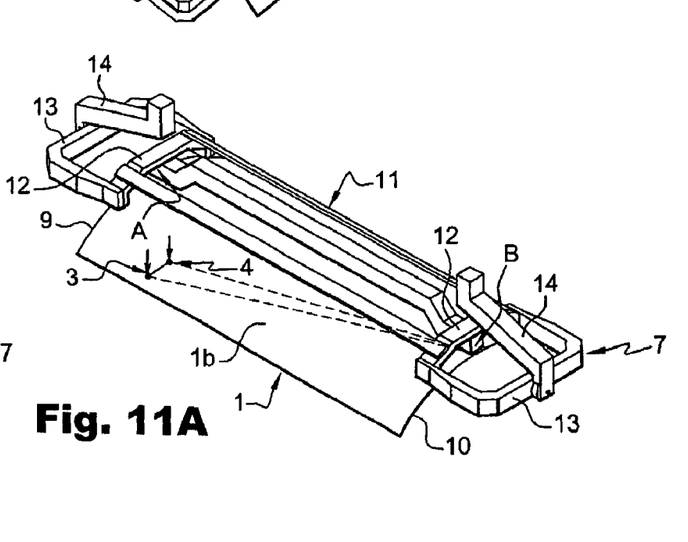
FIGS. 11a and 11b illustrate a second isostatic method of positioning.
Figure 11B:
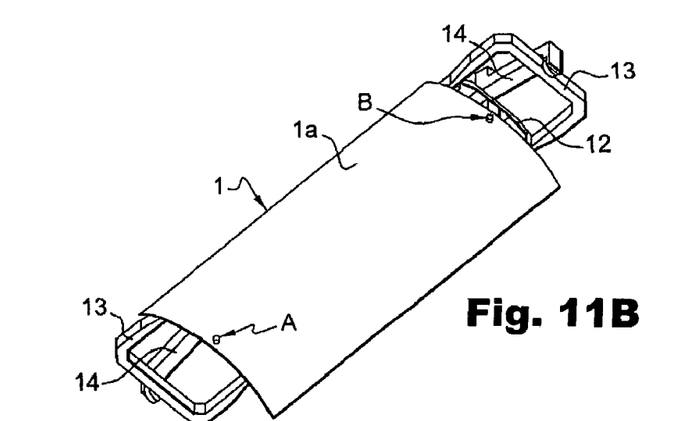

The positioning of panel 1 can be accomplished according to a second method illustrated by FIGS. 11a and 11b, with FIG. 11b being a bottom view of the device of FIG. 11a.

The isostatic positioning is, in this case, ensured by rigging the pinholes A and B engaged by the means 7 and by two complementary support points 3 and 4 ensured by two of the three stops 33 of window 8, which points 3 and 4 define a reference plane along with one of the pinhole points (B).

The positioning sequence proceeds as follows:

The window 8 is initially placed in the theoretical position of surface 1b of panel 1 according to the same process as that described above concerning the positioning method according to FIGS. 10a, 10b.

Figures 12, 13:
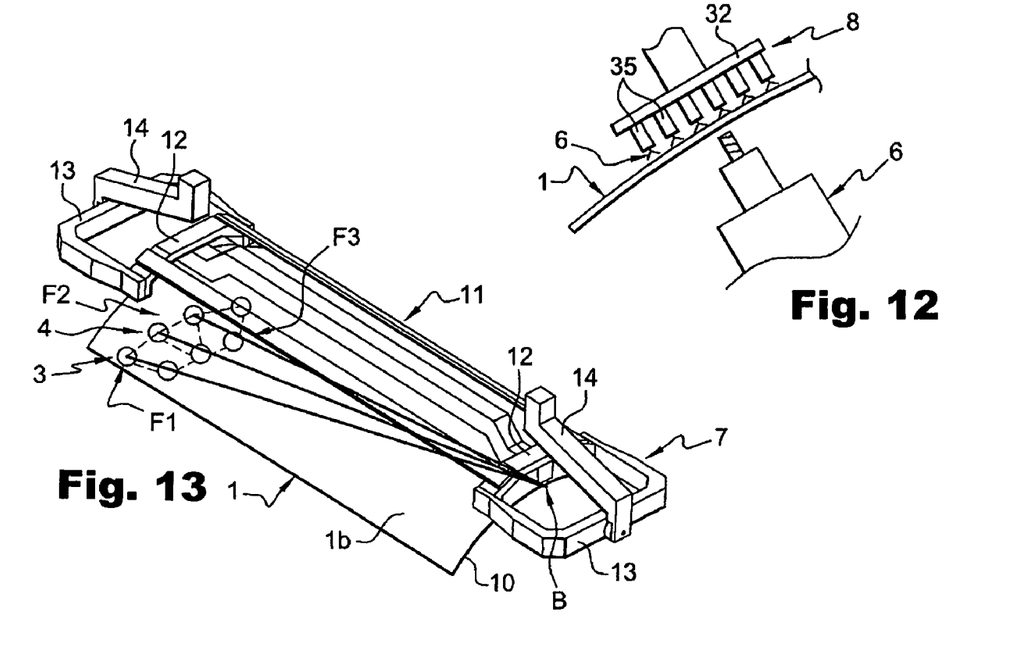
FIG. 12 is a diagram illustrating the positioning of the machining head during machining within a window.
FIG. 13 is a diagram illustrating the method of displacement of the machining window in the case of isostatic positioning according to FIGS. 11a, 11b.
Figure 15:
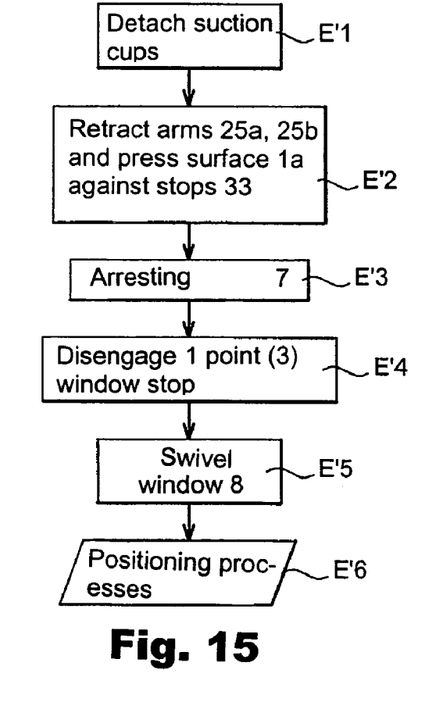
FIG. 15 is a flow chart describing the method of actuating the means for holding the suction cups in a mode in conformity with FIGS. 11a, 11b.

The positioning method according to FIGS. 11a, 11b allows a progression of windowing operations, i.e., of machining operations from a given area of surface 1a to an adjacent area via a displacement of window 8 in the manner of a land-surveyor, as illustrated by FIG. 13 and FIG. 15, which is a flow chart of the progression process of the window.

FIG. 13 illustrates the passage of window 8 from a first position F1 to a second immediately adjacent position F2, then to a third, also immediately adjacent position F3.

The step E'1 In FIG. 15 involves the detachment of suction cups 37 (for example, in case of the passage from a position F1 to the subsequent position F2).

At step E'2, retractable arms 25a and 25b are applied against the surface of the panel so as to press the latter against one of the stops 33 of window 8 (e.g., the point 4, FIG. 13).

At step E'4, the second stop 33 being employed is released (point 3, FIG. 13).

At step E'5, window 8 is made to swivel around the point 4 so as to carry it to the subsequent position F2.

At step E'6, suction cups 37 are repositioned to hold surface 1b of the panel, including measurement of the profile of this new area, which is adjacent to the preceding one.

Thereafter, via an identical process, one passes from the windowing position F2 to the position F3 via a rotation of window 8 about the point 3 into its new position, the point 4 then being released, and the entire area of the surface of the panel to be machined is thus covered sequentially.

This method for displacing window 8 is in particular applicable for machining recesses or for routing over areas of greater extent than that covered by window 8.

Regardless of the method of progression selected, the process of holding and fixing window 8 in position leads to a measurement of the position and the shape of the "external skin" (1a) of panel 1 and ensures its contact with the bottom of suction cups 37 (reference of the measurement). This information can be used to correct the trajectory corresponding to the desired machining operation.

Figure 16:
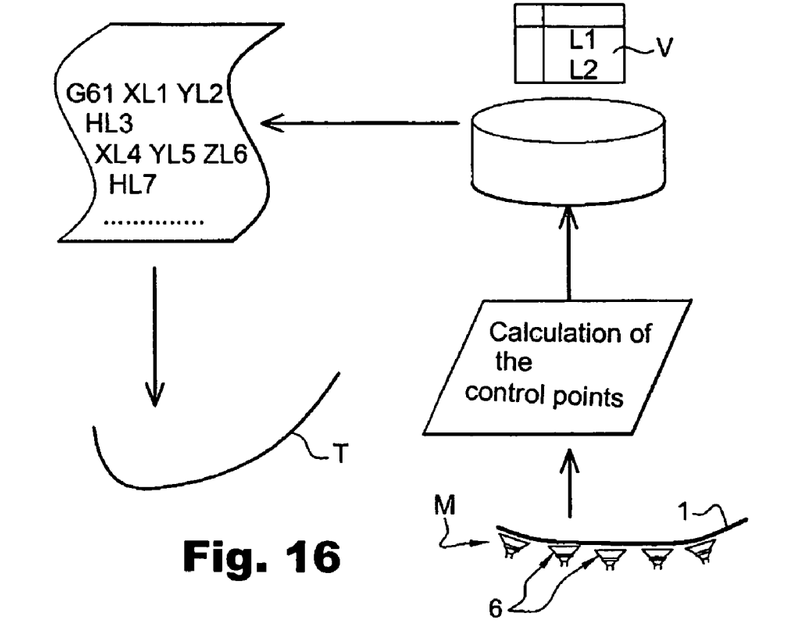
FIG. 16 is a synoptic diagram illustrating the principle of correction of the machining trajectory.

FIG. 16 is a synoptic of the principle of in situ correction of the trajectory.

The curve represented by T is the actual profile of the trajectory. Based on measurements of surface M achieved when suction cups 37 are locked in position, the coordinates relating to these measurements are stored to a table known as of the variables V. The values in this table V are then read in order to substitute them for the variables of the trajectory. With the degree and the form of the interpolation function having been fixed in advance, the calculation of the control points based on the measured points (M) is a simple mathematical operation readily achievable by the machine's controlling computer. The time required for this process is a few milliseconds. The principle is presented here in the case of a 3-axis trajectory. It can be generalized to the programming of axes with the generation of two interpolated curves (one for the trajectory and the other for the orientation), both being related by derivation.

FIG. 12 is a diagram illustrating the mutual positions of window 8 and the machining tool 6, e.g., when a recess on surface 1a of panel 1 is produced.

Figure 17:
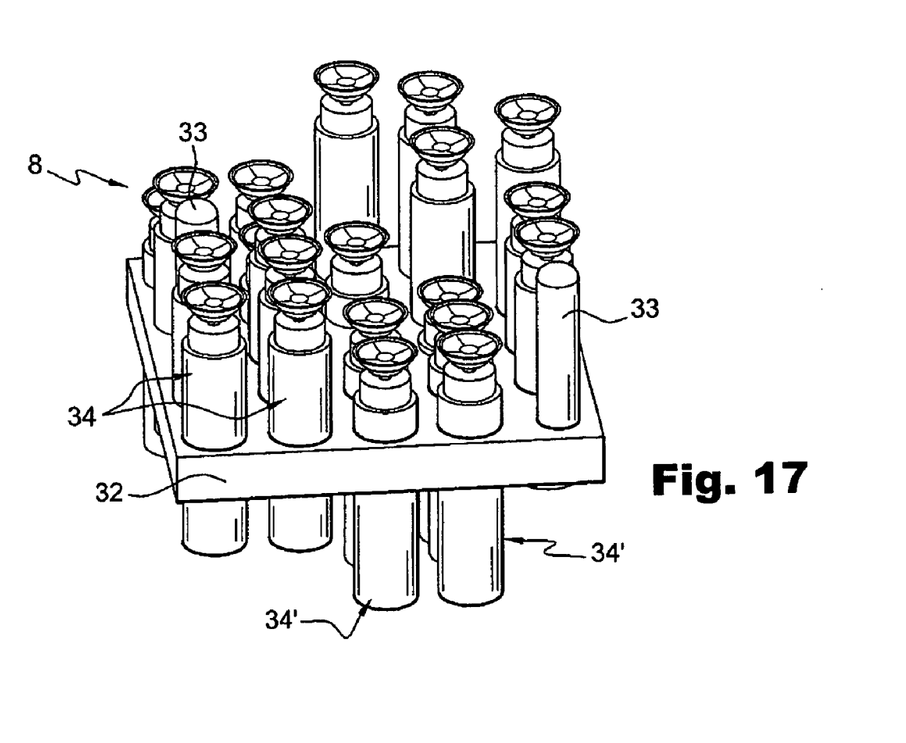
FIG. 17 is a view similar to that of FIG. 6 showing the retracted position of some suction cups for machining, in particular for routing.

A routing operation is performed according to principles similar to the machining of a recess. A displacement kinematics of window 8 according to FIG. 13 will preferably be used. Moreover, since the panel is traversed by the cutter, the suction cup devices 34 of window 8 that may be in the way of the cutter will be retracted as illustrated by FIG. 17 where some of the devices (34') are placed in a low, retracted position by actuating motors 38, with arms 48 of the locking devices 47 being disengaged and restraints 42 of fixing devices 41 being retracted.

Furthermore, compressed air is blown across the suction cups that are employed so as to avoid the depositing of chips. Routing is finally performed by leaving behind bridges every 500 mm, which corresponds approximately to the width of window 8 in the example being described, in order to preserve the cuttings attached to panel 1.

The process disclosed in the invention has the following advantages:

Isostatic positioning without stressing panel 1 (no deformation in the course of machining)

Automatic machine programming (machining trajectories and positioning windowing) "within theoretical" limits Referencing to the external surface (1b) of the panel (guaranteed machining depth)

Instantaneous measurement of the actual shape nearest to the supports (33) (no change in points of reference)

Instantaneous trajectory correction

Two operating methods (associates with two positioning kinematics)

Possible change in operating method without a change in equipment

"Complex" controls (positioning, fitting of window 8, trajectory correction, etc.) except for the machining phase (safety for part 1).

It should be noted that the positions of tools 6 and holding means 8 can be reversed, with means 8 being applied to concave surface 1a of panel 1.

Of course, the invention applies to all kinds of panels, regardless of their constitutive materials, e.g., metal or composite, and regardless of the manufacturing process.

The invention claimed is:

1. A device for positioning and machining a thin panel having a complex non-deformable shape, said device including:

a means for isostatic positioning of the panel that is to be machined, a means for holding one of the surfaces of the panel in position over a predetermined extent, without introducing hyperstatism;

a means for measuring an actual shape of said surface with regard to said holding means;

a means for displacing said holding means with regard to said surface of the panel;

a multi-axis means of machining located over to another surface of the panel; and means for synchronously controlling the successive displacement and location of said holding means with regard to each of one or more said machining windows, and said machining means successively perpendicular to each machining window.

2. A device according to claim 1, said means for holding without hyperstatism comprising a support having at least two positioning stops operating in conjunction with said isostatic positioning means to ensure isostatic positioning, a plurality of prehensile suction cups movable into a usual position with regard to said surface that is to be held in position, and means for contacting and locking each suction cup in a position for holding said surface, after isostatic positioning of the panel.

3. A device according to claim 1, wherein said holding means includes a plurality of suction cups that are lockable into position for holding the surface of the panel, and wherein said means for measuring the actual shape of the surface of the panel with regard to said holding means comprising for each of said suction cups, a sensor that measures the location of the respective suction cup after the respective suction cup is locked in position for holding the surface of the panel, said sensors being connected to a means for calculating the shape of the surface of the panel by interpolation of the positions of the various suction cups.

4. A device according to claim 1, wherein the holding means includes a turntable, at least three stops that are arranged in a triangle, and a plurality of suction cup devices distributed evenly in the space between said stops, with each suction cup device including a suction cup mounted to slide perpendicular to the turntable, and a means for placing the respective suction cup against the surface of the panel, applying a vacuum to the respective suction cup, and locking the respective suction cup in a position of capture without a local deformation of said panel.

5. A device according to claim 4, wherein the means for locking the respective suction cup in a position of capture comprise a motor, detachable means for translational displacement of a sleeve, detachable means for arresting the displacement of said sleeve, and a sliding centering pin installed in said sleeve and connected to a suction cup via a contractible bladder.

6. A device according to claim 4, wherein the suction cup devices are installed on said turntable in a retractable manner.

* * * * *